United States Patent
Fujimura et al.

(10) Patent No.: US 12,081,813 B2
(45) Date of Patent: Sep. 3, 2024

(54) VIDEO DISTRIBUTION METHOD, DISTRIBUTION DEVICE, AND INSPECTION DEVICE

(71) Applicant: Nippon Telegraph and Telephone Corporation, Tokyo (JP)

(72) Inventors: Shigeru Fujimura, Tokyo (JP); Hiroki Watanabe, Tokyo (JP); Tatsuro Ishida, Tokyo (JP); Shigenori Ohashi, Tokyo (JP); Atsushi Nakadaira, Tokyo (JP); Kota Hidaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 67 days.

(21) Appl. No.: 17/286,292

(22) PCT Filed: Oct. 4, 2019

(86) PCT No.: PCT/JP2019/039311
§ 371 (c)(1),
(2) Date: Apr. 16, 2021

(87) PCT Pub. No.: WO2020/080147
PCT Pub. Date: Apr. 23, 2020

(65) Prior Publication Data
US 2021/0360300 A1    Nov. 18, 2021

(30) Foreign Application Priority Data

Oct. 19, 2018   (JP) ................................. 2018-197208

(51) Int. Cl.
*H04N 21/2389* (2011.01)
*H04N 21/472* (2011.01)
*H04N 21/8358* (2011.01)

(52) U.S. Cl.
CPC . *H04N 21/23892* (2013.01); *H04N 21/47217* (2013.01); *H04N 21/8358* (2013.01)

(58) Field of Classification Search
CPC ......... H04N 21/23892; H04N 21/8358; H04N 21/4318; H04N 19/467
See application file for complete search history.

(56) References Cited

U.S. PATENT DOCUMENTS 7,970,164 B2   6/2011   Nakamura et al.
8,126,202 B2   2/2012   Nakamura et al.
(Continued)

FOREIGN PATENT DOCUMENTS

JP   2001069336   3/2001
JP   2002027223   1/2002
(Continued)

OTHER PUBLICATIONS

Kishigami et al., "Introduction to Blockchain Technology," Morikita Publishing, May 2017, 20 pages (with English Translation).
(Continued)

*Primary Examiner* — Pinkal R Chokshi
(74) *Attorney, Agent, or Firm* — Fish & Richardson P.C.

(57) ABSTRACT

A digital watermark is applied to a video to be distributed without re-encoding. A content distribution device 1 receives a content acquisition request to request video content, distributes the video content based on the content acquisition request, generates and distributes a watermark video with a watermark ID embedded, and causes watermark-video-related information including the watermark ID to be recorded, and a content playback device 2 transmits the content acquisition request, receives the video content and the watermark video, plays back and displays the video content, and superimposes the watermark video on the video content for playback and display.

7 Claims, 5 Drawing Sheets

(56) References Cited

U.S. PATENT DOCUMENTS

| | | | |
|---|---|---|---|
| 9,935,772 B1* | 4/2018 | Madisetti | H04L 9/0819 |
| 10,397,650 B1* | 8/2019 | Brown | H04N 21/44204 |
| 10,834,457 B1* | 11/2020 | Bourgoyne | H04N 21/4318 |
| 2008/0089552 A1 | 4/2008 | Nakamura et al. | |
| 2008/0280677 A1 | 11/2008 | Cooper | |
| 2011/0228972 A1 | 9/2011 | Nakamura et al. | |
| 2014/0359655 A1 | 12/2014 | Diehl | |
| 2015/0055934 A1* | 2/2015 | Gupta | G11B 27/105 386/241 |
| 2017/0171643 A1* | 6/2017 | Zhang | H04N 21/8358 |
| 2019/0294761 A1* | 9/2019 | Kim | H04L 9/3239 |
| 2019/0313161 A1* | 10/2019 | Wilms | H04N 21/8456 |
| 2020/0012765 A1* | 1/2020 | Smaiely | H04L 9/0637 |
| 2020/0029128 A1* | 1/2020 | Erskine | H04N 21/25866 |
| 2021/0200903 A1* | 7/2021 | Singh | H04L 63/123 |

FOREIGN PATENT DOCUMENTS

| | | |
|---|---|---|
| JP | 2009-516437 | 4/2009 |
| JP | 2011-78141 | 4/2011 |
| JP | 2012-142781 | 7/2012 |
| JP | 2015-512073 | 4/2015 |

OTHER PUBLICATIONS

Nakadaira et al., "Addition of tracking information about content entities in content right management using blockchain," Proceedings of the 2018 ITE Annual Convention, The Institute of Image Information and Television Engineers, Aug. 2018, 2 pages.

PCT International Search Report in International Appln. No. PCT/JP2019/039311, dated Dec. 6, 2019, 5 pages (with English Translation).

* cited by examiner

| WATERMARK ID | GENERATION TIME | DISTRIBUTION DESTINATION INFORMATION | CONTENT ID |
|---|---|---|---|
| E903C6F7 | 2018/09/03 14:32:44 | id_203651 | title_341 |
| 951EFFE0 | 2018/09/03 19:12:37 | id_132642 | title_285 |
| 23B03F5D | 2018/09/03 21:08:57 | id_724143 | title_856 |
| ..... | ..... | ..... | ..... |

VIDEO DISTRIBUTION METHOD, DISTRIBUTION DEVICE, AND INSPECTION DEVICE

CROSS-REFERENCE TO RELATED APPLICATIONS

This application is a National Stage application under 35 U.S.C. § 371 of International Application No. PCT/JP2019/039311, having an International Filing Date of Oct. 4, 2019, which claims priority to Japanese Application Serial No. 2018-197208, filed on Oct. 19, 2018. The disclosure of the prior application is considered part of the disclosure of this application, and is incorporated in its entirety into this application.

TECHNICAL FIELD

The present invention relates to a technique for applying a digital watermark to a video.

BACKGROUND ART

As the simplest method for indicating the sender of video content, for example, there is a method of embedding a sender-specific logo in the video at an upper-right corner sized such that the logo does not obstruct viewing. However, if this method is used, the original functionality of the logo may be easily lost by an ill-intentioned user attempting to overlay a black or white object on the region around the logo.

There is a technique called digital watermarking as a technique for protecting the copyright of video content. Digital watermarking is a technique of embedding information by applying a small change such as noise to video content in a form in which the change is unlikely to be perceived by human eyes but is detectable by a machine (see Patent Literature 1). The right holder or the sender of the video content can be identified from the information embedded in the video content.

CITATION LIST

Patent Literature

Patent Literature 1: JP 2011-78141 A

Non-Patent Literature

Non-Patent Literature 1: Junichi Kishigami, Shigeru Fujimura, Daiki Watanabe, Morinori Ohashi, Atsushi Nakadaira, "Introduction to Blockchain Technology," First edition, Morikita Publishing Co., Ltd., 2017, pp. 2 to 11, and 115 to 122

SUMMARY OF THE INVENTION

Technical Problem

As a result of the increasing popularity of video distribution sites on the Internet in recent years, video distribution sites have to meet a great deal of demands from many users. If a digital watermarking technique is employed under such circumstances, re-encoding is basically required to embed information of a digital watermark in video content. Since the re-encoding process entails an increasing processing load as video content has higher resolution, a vast amount of system investment in a video distribution site is needed accordingly.

Furthermore, in a case in which information to be embedded as a digital watermark includes not only the right holder and the distributor of the video content but also a distribution destination, there may be a problem that it is difficult to exclude a possibility of the distributor who could unilaterally embed the information as a watermark as long as there is no third party witness who can testify that the distributor and the distribution destination certainly exchanged the video content.

The present invention has been made in view of the above-described circumstance and aims to apply a digital watermark to a video to be distributed without re-encoding.

Means for Solving the Problem

A video distribution method according to the present invention includes, at a distribution device, receiving an acquisition request to request video content, distributing the video content based on the acquisition request, distributing a watermark video with watermark information embedded, and recording watermark-video-related information including the watermark information, and at a playback device, transmitting the acquisition request, receiving the video content, receiving the watermark video, and playing back and displaying the video content and superimposing the watermark video on the video content for playback and display.

The recording of the watermark-video-related information according to the above-described video distribution method includes issuing the watermark-video-related information to a blockchain network as a transaction and recording the watermark-video-related information in a blockchain.

The video distribution method includes, at an inspection device, detecting the watermark information from a video and acquiring the watermark-video-related information recorded in the blockchain based on the detected watermark information.

A distribution device according to the present invention includes a request reception unit configured to receive an acquisition request for video content, video content distribution unit configured to distribute the video content based on the acquisition request, a watermark video distribution unit configured to distribute a watermark video with watermark information embedded, a watermark information recording unit configured to record watermark-video-related information including the watermark information, and a watermark video distribution unit configured to distribute the watermark video.

The distribution device includes a blockchain control unit configured to issue the watermark-video-related information as a transaction to a blockchain network and record the watermark-video-related information in a blockchain.

A playback device according to the present invention includes transmitting an acquisition request to request video content, a video content reception unit configured to receive the video content, a watermark video reception unit configured to receive a watermark video with watermark information embedded, the watermark information being generated based on the acquisition request, and a playback unit configured to play back and display the video content and superimpose the watermark video on the video content for playback and display.

An inspection device according to the present invention is an inspection device configured to inspect watermark information embedded in a watermark video that is superimposed on video content and displayed during playback, in which watermark-video-related information including the watermark information is recorded in a blockchain, and the inspection device includes a watermark information detection unit configured to detect the watermark information from a video, and a relevant information acquisition unit configured to acquire the watermark-video-related information recorded in the blockchain based on the detected watermark information.

A program according to the present invention causes a computer to operate as each unit of the distribution device, playback device, or inspection device.

Effects of the Invention

According to the present invention, a digital watermark can be applied to a video to be distributed without re-encoding.

DESCRIPTION

First Embodiment

Figure 1:
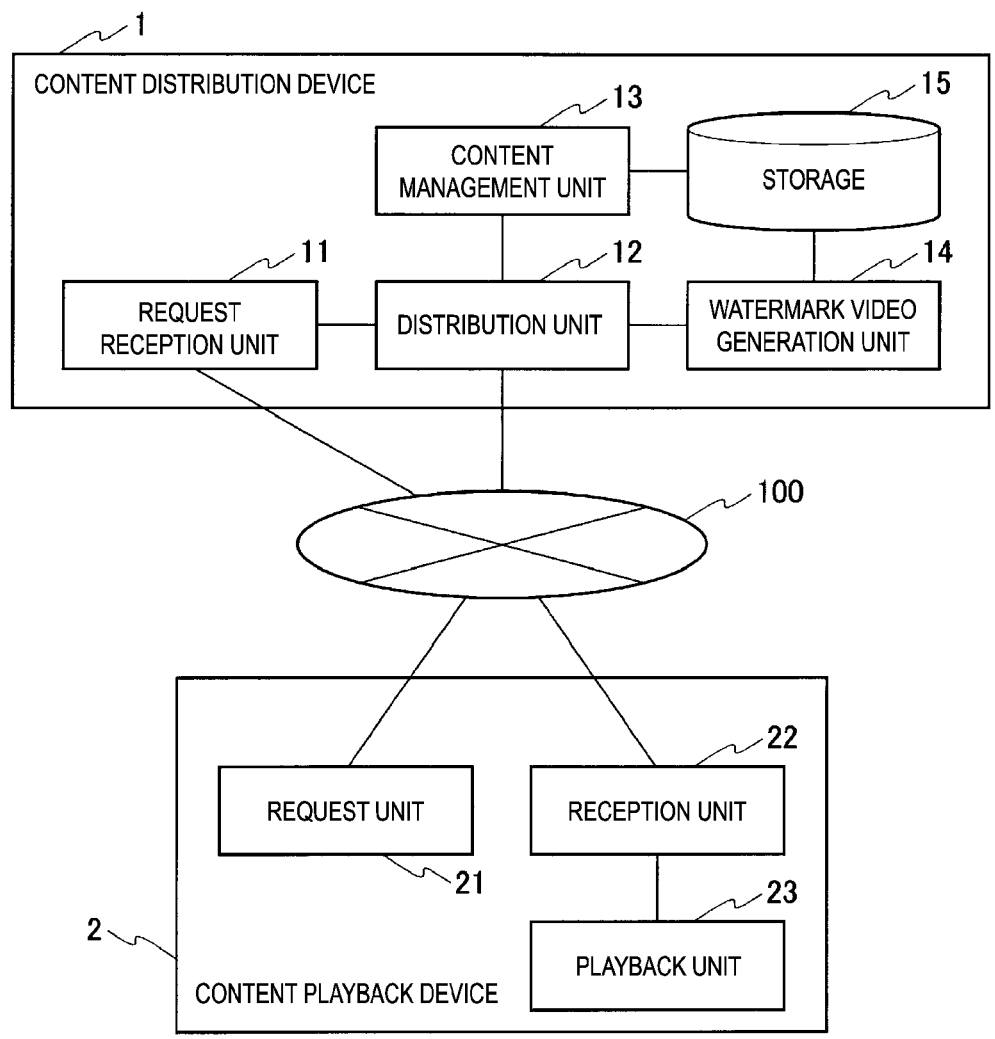
FIG. 1 is an overall configuration diagram including a content distribution device and a content playback device according to a first embodiment.

FIG. 1 is an overall configuration diagram including a content distribution device 1 and a content playback device 2 according to a first embodiment. The content distribution device 1 and the content playback device 2 are connected to a network 100. After the content playback device 2 transmits a content acquisition request to the content distribution device 1, the content acquisition request including information of the video (hereinafter, referred to as "video content") that the viewer desires to view, the content distribution device 1 distributes the video content intended for viewing based on the content acquisition request, and generates and distributes a watermark video for digital watermarking. The content playback device 2 receives the video content and the watermark video, and superimposes the watermark video as a transparent layer on the video content for playback.

First, the content distribution device 1 will be described. The content distribution device 1 includes a request reception unit 11, a distribution unit 12, a content management unit 13, a watermark video generation unit 14, and a storage 15.

The request reception unit 11 receives a content acquisition request to request video content from the content playback device 2. More specifically, for example, the request reception unit 11 receives the content acquisition request as an HTTP request.

Based on the content acquisition request, the distribution unit 12 distributes streaming of the distribution target video content acquired through the content management unit 13 and the watermark video generated by the watermark video generation unit 14 to the content playback device 2.

The content management unit 13 manages video content stored in the storage 15. The content management unit 13 passes the requested video content to the distribution unit 12. The content management unit 13 may perform control of whether to pass the video content to the distribution unit 12 based on, for example, a user ID or the like.

The watermark video generation unit 14 generates the watermark video based on information of the content acquisition request acquired via the distribution unit 12, and records information related to the watermark video (hereinafter referred to as "watermark-video-related information") in the storage 15. The watermark-video-related information in FIG. 2 includes a watermark ID, a generation time, distribution destination information, and a content ID. The watermark ID is an identifier for uniquely identifying watermark-video-related information. The generation time is information indicating the time at which the watermark video is generated. The distribution destination information is information for identifying a distribution destination of the video content, and may be, for example, a user ID for a site in the case of a video distribution site, or the like, or an IP address of the transmission source included in the content acquisition request. The content ID is an identifier for uniquely identifying the video content requested in the content acquisition request, that is, the video content on which the watermark video is to be superimposed. Here, in addition to the information described above, information of the right holder of the video content, information such as on the title of the content, and the like may be added to the watermark-video-related information.

Minimum information to be embedded in the watermark video is a watermark ID. A watermark video with only a watermark ID embedded is a video with about several tens of frames, and thus a small load is imposed on processing to generate the watermark video. In addition, in a case in which a user ID and a content ID can be specified in advance, such as a case in which information based on the user ID for a video distribution site is used as distribution destination information, a waiting time of the user of the content playback device 2 can be reduced by generating a watermark video in advance.

Next, the content playback device 2 will be described. The content playback device 2 includes a request unit 21, a reception unit 22, and a playback unit 23.

The request unit 21 transmits a content acquisition request to the content distribution device 1. The content acquisition request includes information for identifying video content such as a content ID. The content acquisition request may include distribution destination information such as a user ID.

The reception unit 22 receives streaming of the video content and the watermark video from the content distribution device 1 and passes it to the playback unit 23.

The playback unit 23 plays back and displays the video content, and plays back and displays the watermark video, that is superimposed on the video content and is applied with a predetermined transmittance. More specifically, in a case in which a web technology is applied to playback of content, a display region with a video tag or a canvas tag is superimposed, the video content is displayed in the lower layer, and the watermark video applied with the prescribed transmittance is displayed in the upper layer. As a result, superimposition display in which the watermark video is overlaid on the video content for display can be realized. A transmittance of the watermark video is set separately.

The watermark video has about several tens of frames, and the playback time of the watermark video is shorter than the playback time of the video content. The playback unit 23 may hold the received watermark video and repeatedly play back the watermark video while the video content is being played back. A reduction in the amount of communication can be expected by reducing the amount of data of the watermark video and repeatedly playing back the watermark video. In particular, the longer the playback time of the video content is, the higher the effect of reducing the amount of communication is. Note that, in a case in which pause, fast forward, and unwinding operations are performed for the video content, the playback unit 23 may apply the same operation to the watermark video, or may continue to repeatedly play back the watermark video regardless of the operations on the video content.

Figures 2, 3:
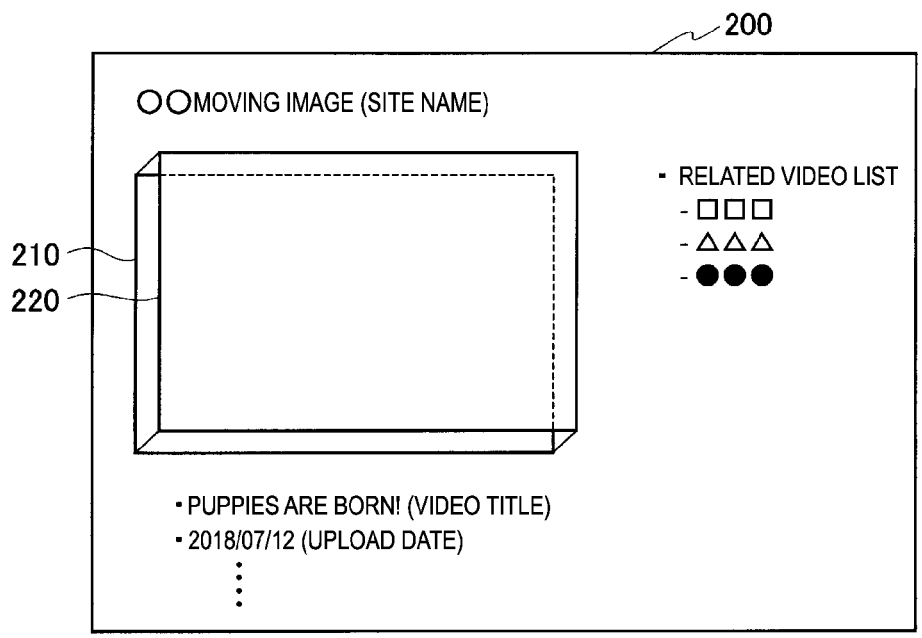
FIG. 2 is a diagram illustrating an example of watermark-video-related information associated with a watermark video.
FIG. 3 is a diagram illustrating an example of display of video content by the content playback device.

FIG. 3 illustrates an example of display of video content by the content playback device 2. FIG. 3 illustrates an example of displaying video content on a video site. On a display screen 200 of the content playback device 2, a display region 220 displaying a watermark video applied with a separately set transmittance (e.g., 30%) is displayed by being superimposed on a display region 210 displaying video content to be viewed. The display region 220 is displayed such that the display region 220 is superimposed to completely cover the display region 210.

Next, operations of the content distribution device 1 and the content playback device 2 will be described.

Figure 4:
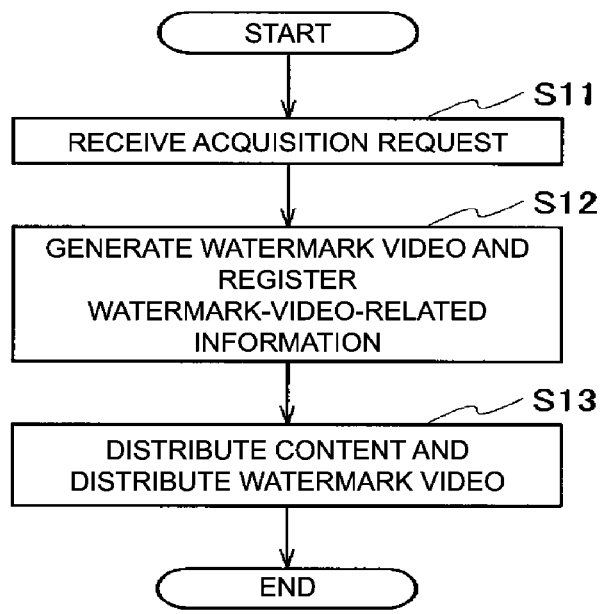
FIG. 4 is a flowchart showing processing of the content distribution device.

FIG. 4 is a flowchart showing processing of the content distribution device 1.

After the request reception unit 11 receives a content acquisition request, the distribution unit 12 makes a request for video content to the content management unit 13 and a request for a watermark video to the watermark video generation unit 14 based on the content acquisition request (step S11).

The watermark video generation unit 14 generates a watermark video based on the content acquisition request acquired via the distribution unit 12, and records watermark-video-related information in the storage 15 (step S12). For example, the watermark video generation unit 14 generates a watermark ID and generates a watermark video in which the watermark ID is embedded as a digital watermark. The watermark video generation unit 14 records, in the storage 15, the watermark ID, the generation time, the distribution destination information, and the content ID by associating them with one another. The distribution destination information and the content ID can be acquired from the content acquisition request.

The distribution unit 12 distributes the video content received from the content management unit 13 to a transmission source of the content acquisition request, and distributes the watermark video received from the watermark video generation unit 14 to the transmission source of the content acquisition request (step S13). The video content and the watermark video are distributed separately.

Figure 5:
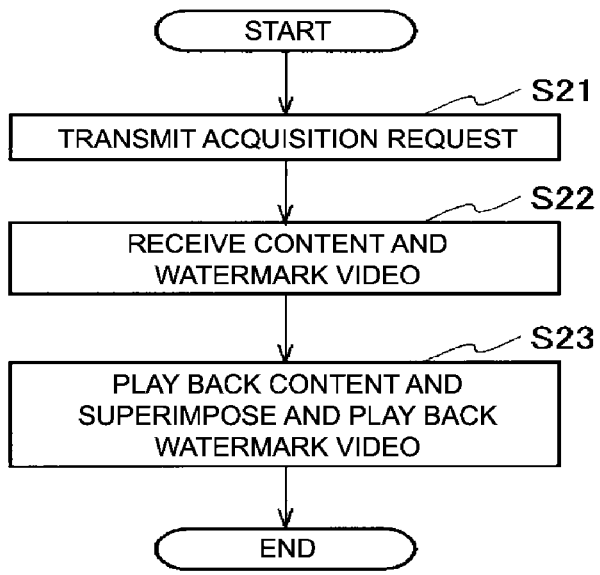
FIG. 5 is a flowchart showing processing of the content playback device.

FIG. 5 is a flowchart showing processing of the content playback device 2.

The request unit 21 transmits, to the content distribution device 1, a content acquisition request to request video content which a user desires to view (step S21). The content acquisition request may include a content ID indicating the video content to be viewed and a user ID which is distribution destination information, and the like.

After receiving the video content and the watermark video, the reception unit 22 hands over the video content and the watermark video to the playback unit 23 (step S22).

The playback unit 23 superimposes a region in which the watermark video is displayed on the region in which the video content is displayed to display the video content and the watermark video in a superimposed manner (step S23).

In a case in which a user of the video content has ill-intends, the user is likely to capture a screen being played of the video content to digitally store the video and audio, i.e., the entire video content, and thus cause unintended leakage of the video content. In such a circumstance, when the user captures the screen being played of the content playback device 2, the video content with the watermark ID is captured. Thus, the watermark ID can be detected from the captured video.

As described above, according to the present embodiment, the content distribution device 1 receives a content acquisition request to request video content and distributes the video content based on the content acquisition request. In addition, the content distribution device 1 generates and distributes a watermark video with a watermark ID embedded, and records watermark-video-related information including the watermark ID. Furthermore, the content playback device 2 transmits the content acquisition request, receives the video content and the watermark video, and plays back and displays the video content. In addition, the content playback device 2 superimposes the watermark video on the video content and performs playback and display so as to enable the distribution of the video to which information on the digital watermark has been applied without performing a re-encoding process. In addition, since re-encoding is unnecessary, it is possible to reduce a delay by not performing the re-encoding process in live distribution. Furthermore, since the video content and the watermark video are distributed separately, even in a case in which a user desires to embed different digital watermarks for each distribution destination, all users can use an identical video content, which can contribute to a reduction in the storage area of the distribution site.

Second Embodiment

Figure 6:
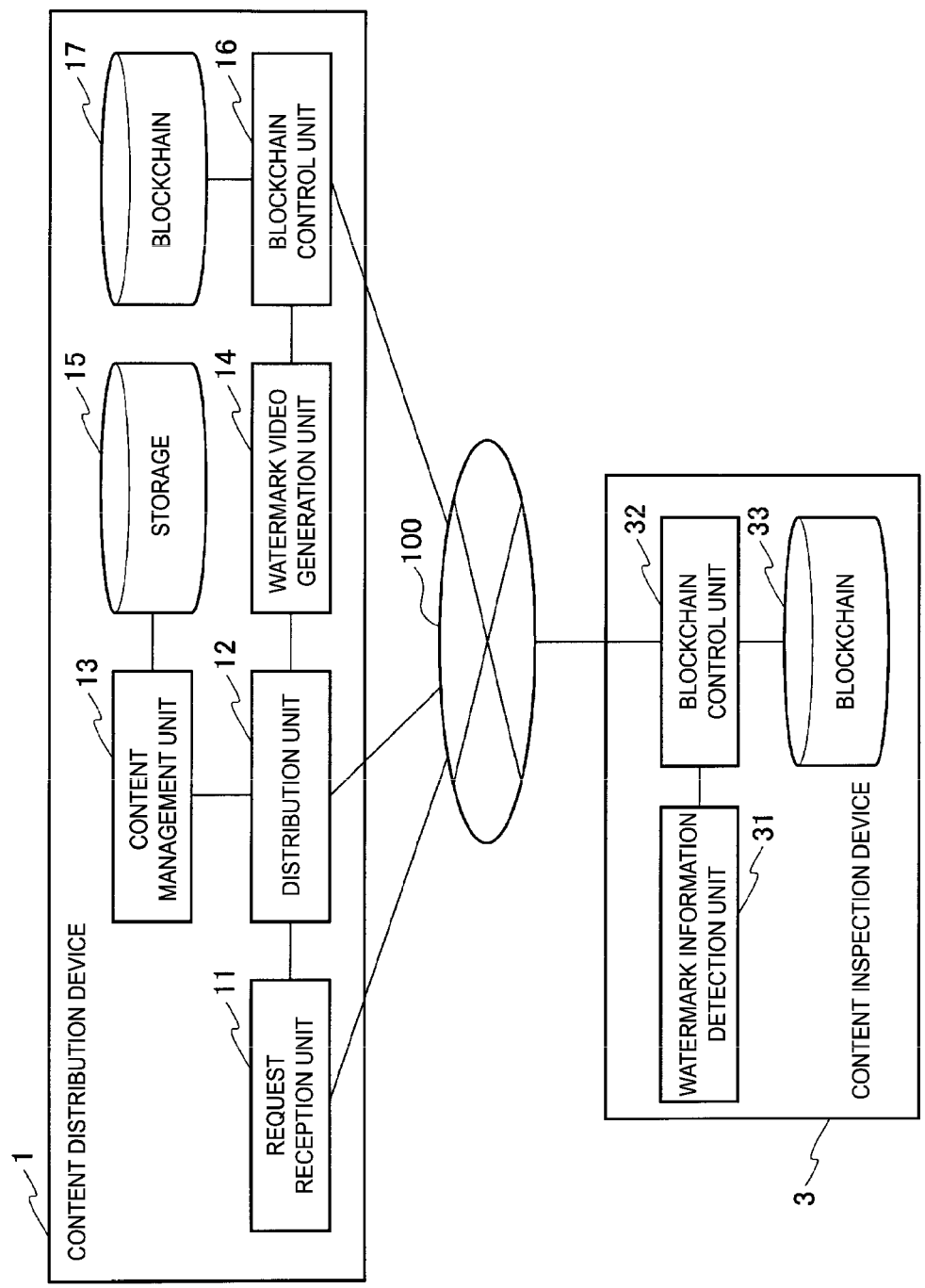
FIG. 6 is an overall configuration diagram including a content distribution device and a content inspection device according to a second embodiment.

FIG. 6 is an overall configuration diagram including a content distribution device 1 and a content inspection device 3 according to a second embodiment. In FIG. 6, the content playback device 2 is not illustrated. The content playback device 2 is the same as that of the first embodiment. The content distribution device 1 that separately distributes the video content and the watermark video and the content playback device 2 that superimposes the watermark video on the video content for display are the same as those in the first embodiment.

In the second embodiment, a blockchain is utilized to record watermark-video-related information. In a blockchain, reliability of communicated information is ensured by the process of building consensus within distributed networks. In addition, soundness is preserved by preventing impropriety such as tampering from the whole system.

The content distribution device 1 issues, to a blockchain network, watermark-video-related information as a transaction. When the transaction is recorded as a block in the blockchain, a so-called notarization effect is obtained. After a watermark ID is detected from video content that is suspected of having been leaked, the content inspection device 3 obtains, from the transaction recorded in the blockchain, the watermark-video-related information corresponding to the detected watermark ID. Although not illustrated, other devices such as minor devices that collect transactions issued to the blockchain network to produce blocks participate in the blockchain network.

First, the content distribution device 1 will be described. The content distribution device 1 includes a request reception unit 11, a distribution unit 12, a content management unit 13, a watermark video generation unit 14, a storage 15, a blockchain control unit 16, and a blockchain 17.

The request reception unit 11, the distribution unit 12, and the content management unit 13 are the same as those of the first embodiment.

Although the watermark video generation unit 14 is the same as the watermark video generation unit in the first embodiment in generating a watermark video, differs in registering the watermark-video-related information in the blockchain rather than the storage 15. The watermark video generation unit 14 generates a watermark video, and hands the watermark-video-related information over to the blockchain control unit 16.

The blockchain control unit 16 issues the watermark-video-related information received from the watermark video generation unit 14 to the blockchain network as a transaction. Each device participating in a blockchain network collects transactions and generates blocks including transactions, and the blocks are linked to a blockchain. A blockchain is a distributed ledger with a data structure in which transactions are organized as blocks and the blocks are linked in a chain shape. Devices constituting a blockchain network hold and share the same blockchain. The blockchain control unit 16 operates in coordination with other devices constituting the blockchain network, and keeps the blockchain 17 held by the content distribution device 1 up to date.

Next, the content inspection device 3 will be described. The content inspection device 3 includes a watermark information detection unit 31, a blockchain control unit 32, and a blockchain 33.

The watermark information detection unit 31 detects the watermark ID from the video suspected of having been leaked, and hands over the detected watermark ID to the blockchain control unit 32. A screen played by the content playback device 2 is captured to detect the watermark ID from the video that has been leaked.

Similarly to the blockchain control unit 16 of the content distribution device 1, the blockchain control unit 32 operates in coordination with other devices constituting the blockchain network, and keeps the blockchain 33 held by the content inspection device 3 up to date.

The blockchain control unit 32 acquires watermark-video-related information corresponding to the watermark ID based on the information of the transaction recorded in the blockchain 33. By acquiring the watermark-video-related information, it is possible to identify the source of leakage of the video content from the distribution destination information included in the watermark-video-related information.

Figure 7:
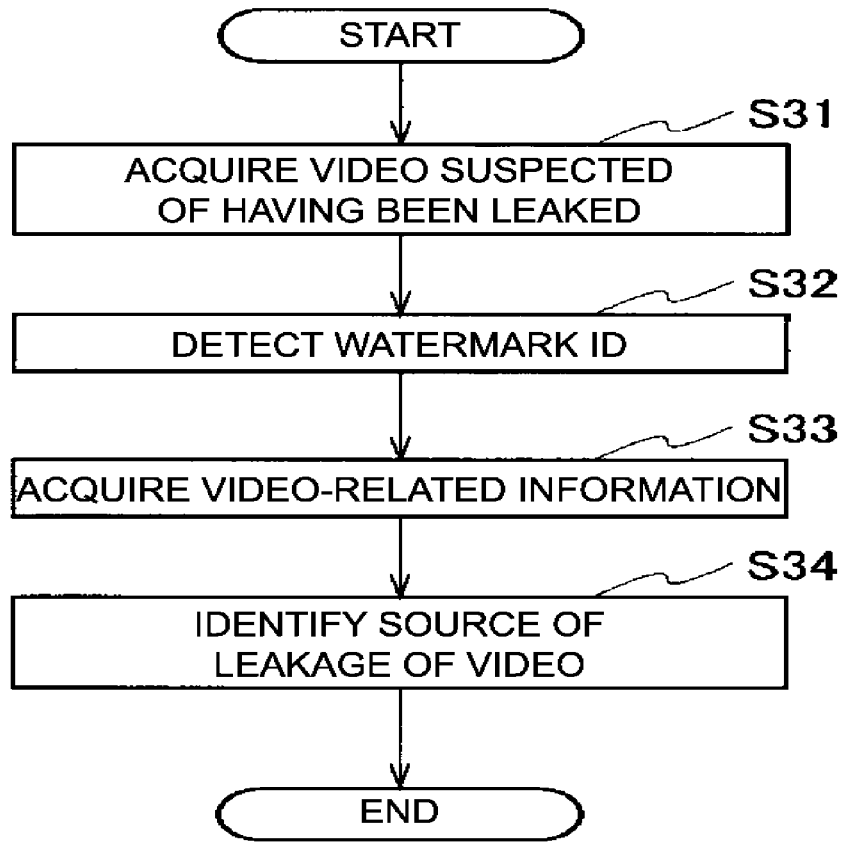
FIG. 7 is a flowchart showing processing to locate the source of leakage of leaked video content.

Next, operations of the content inspection device 3 will be described. FIG. 7 is a flowchart showing processing to locate the source of leakage of leaked video content.

After a video that is suspected of having been leaked is acquired and input to the watermark information detection unit 31 (step S31), the watermark information detection unit 31 detects the watermark ID from the video that is suspected of having been leaked (step S32). After the watermark ID is detected from the video, the watermark information detection unit 31 hands over the watermark ID to the blockchain control unit 32.

Based on the information of the transaction recorded in the blockchain 33, the blockchain control unit 32 acquires video-related information corresponding to the watermark ID (step S33).

The source of leakage of the video can be identified from distribution destination information of the acquired video-related information (step S34).

As described above, according to the present embodiment, the content distribution device 1 issues the watermark-video-related information as a transaction to the blockchain network, and records the information in the blockchain. This allows a third party to inspect the leakage of a video caused by capturing the video content because the watermark-video-related information is published with high tamper resistance.

Note that each of the units of the content distribution device 1, the content playback device 2, and the content inspection device 3 may be configured by a computer provided with an arithmetic processing device, a storage device, or the like, and the processing of each unit may be executed by a program. The program is stored in the storage device provided in each of the content distribution device 1, the content playback device 2, and the content inspection device 3, and can be recorded in a recording medium such as a magnetic disk, an optical disc, or a semiconductor memory, or can be provided through a network. The individual units provided in the content distribution device 1, the content playback device 2, and the content inspection device 3 may be distributed to a plurality of devices, and the content distribution device 1, the content playback device 2, and the content inspection device 3 may be configured by a virtual machine on a cloud.

REFERENCE SIGNS LIST

1 Content distribution device
11 Request reception unit
12 Distribution unit
13 Content management unit
14 Watermark video generation unit
15 Storage
16 Blockchain control unit
17 Blockchain
2 Content playback device
21 Request unit
22 Reception unit
23 Playback unit
3 Content inspection device
31 Information detection unit
32 Blockchain control unit
33 Blockchain

The invention claimed is:
1. A video distribution method comprising:
at a distribution device:
receiving, from a playback device, an acquisition request to request video content, the acquisition request comprising (i) a content identifier indicating the requested video content and (ii) a destination identifier indicating a device for playing the requested video content;

distributing, to the playback device, the video content based on the acquisition request;

generating watermark-video-related information based on the acquisition request, the generated watermark-video-related information comprising a watermark identifier, a generation time, the destination identifier, and the content identifier;

generating a watermark video embedded with the watermark identifier from the acquisition request;

distributing, to the playback device, the generated watermark video separately from the distributed video content; and recording the watermark-video-related information in storage, and at the playback device:

transmitting, to the distribution device, the acquisition request;

receiving, from the distribution device, the distributed video content;

receiving, from the distribution device, the distributed watermark video;

superimposing the watermark video on the played video, wherein the watermark video is overlaid on the played video;

displaying, to a display screen, the played video content and the superimposed watermark video;

playing, on the display screen, the video content and the superimposed watermark video; and fast forwarding or rewinding the played video content while repeatedly playing the superimposed watermark video.

2. The video distribution method according to claim 1, wherein recording, at the distribution device, the watermark-video-related information includes issuing the watermark-video-related information to a blockchain network as a transaction and recording the watermark-video-related information in a blockchain.

3. The video distribution method according to claim 2, comprising:

extracting, at an inspection device, embedded watermark identifier from a video that has been suspected of having been leaked;

acquiring, at the inspection device, the watermark-video-related information recorded in the blockchain based on the extracted watermark identifier;

identifying a source of the leakage using the acquired watermark-video-related information recorded in the blockchain.

4. The video distribution method according to claim 1, wherein a first time corresponding to a length of the video content is greater than a second time corresponding to a length of the watermark video, and wherein the superimposed watermark video loops play each time the second time elapses while the video content is played during the elapsing of the first time.

5. The video distribution method according to claim 4, further comprising:

at the playback device:

during playing of the video content and the superimposed watermark video, pausing the video content and the superimposed watermark video;

during playing of the video content and the superimposed watermark video, fast forwarding the video content and the superimposed watermark video; and during playing of the video content and the superimposed watermark video, rewinding the video content and the superimposed watermark video.

6. The video distribution method according to claim 4, further comprising:

at the playback device:

during playing of the video content and the superimposed watermark video, pausing the video content while repeatedly playing the superimposed watermark video.

7. The video distribution method according to claim 1, wherein the acquisition request is an HTTP request.

* * * * *